US010410323B2

(12) United States Patent
Fujimori

(10) Patent No.: US 10,410,323 B2
(45) Date of Patent: Sep. 10, 2019

(54) DISPLAY APPARATUS, INFORMATION PROCESSING APPARATUS, AND INFORMATION PROCESSING METHOD FOR DISPLAYING A SECOND IMAGE THAT INCLUDES OPTIONS FOR MANIPULATING A FIRST IMAGE

(71) Applicant: SEIKO EPSON CORPORATION, Tokyo (JP)

(72) Inventor: Toshiki Fujimori, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/714,644

(22) Filed: Sep. 25, 2017

(65) Prior Publication Data
US 2018/0089805 A1 Mar. 29, 2018

(30) Foreign Application Priority Data
Sep. 29, 2016 (JP) .................. 2016-190778

(51) Int. Cl.
*G06T 3/60* (2006.01)
*G06F 3/0484* (2013.01)
*G06F 3/03* (2006.01)
*G06F 3/0482* (2013.01)
*G06F 3/0354* (2013.01)

(52) U.S. Cl.
CPC ............. *G06T 3/60* (2013.01); *G06F 3/0304* (2013.01); *G06F 3/03545* (2013.01); *G06F 3/0482* (2013.01); *G06F 3/04845* (2013.01); *G06T 2200/24* (2013.01)

(58) Field of Classification Search
CPC ...... G06F 3/0482; G06F 3/0425; G06F 3/017; G06F 3/011; G06F 3/0488; G06F 3/0416; G06F 3/0346; G06F 3/04883; G06F 3/03545; G06F 3/0304; G06F 3/04845; H04N 9/3185; H04N 9/3194; G09G 2354/00; G06T 3/60; G06T 2200/24
See application file for complete search history.

(56) References Cited

U.S. PATENT DOCUMENTS

2016/0191875 A1* 6/2016 Nagao ................. G06F 3/04845
348/601

FOREIGN PATENT DOCUMENTS

| JP | 2006-164179 A | 6/2006 |
| JP | 2010-176216 A | 8/2010 |
| JP | 2013-125553 A | 6/2013 |
| JP | 2015-088090 A | 5/2015 |

* cited by examiner

Primary Examiner — Maurice L. McDowell, Jr.
(74) Attorney, Agent, or Firm — Oliff PLC

(57) ABSTRACT

A projector includes a position detecting section that detects a pointing action, a projection section that projects handwritten characters on a screen based on the pointing action, and a UI controller that determines, based on the display direction of the displayed handwritten characters, the display direction of a UI screen that allows manipulation of the handwritten characters and projects the UI screen on the screen on the basis of the determined display direction.

8 Claims, 14 Drawing Sheets

DISPLAY APPARATUS, INFORMATION PROCESSING APPARATUS, AND INFORMATION PROCESSING METHOD FOR DISPLAYING A SECOND IMAGE THAT INCLUDES OPTIONS FOR MANIPULATING A FIRST IMAGE

CROSS-REFERENCE

The entire disclosure of Japanese Patent Application No. 2016-190778 filed Sep. 29, 2016 is expressly incorporated by reference herein.

BACKGROUND

1. Technical Field

The present invention relates to a display apparatus, an information processing apparatus, and an information processing method.

2. Related Art

In related art, to perform touch operation with a user's finger or any other object on a display screen on which an object image is displayed, there is a proposed display apparatus that displays an operation pad, which is a user interface that accepts touch operation, in the vicinity of the object image, as shown in JP-A-2015-88090.

The display apparatus, when it displays the operation pad, determines the orientation of the displayed operation pad in such a way that the orientation of the operation pad coincides with that of the display screen having a rectangular shape. Therefore, when the user directly faces the display screen, the display apparatus displays the operation pad in such a way that the operation pad directly faces the user.

In a case where the user faces the object image in an oblique direction with respect to the display screen, however, the user operates the operation in the oblique direction pad because the operation pad is displayed in parallel to the edges of the rectangular shape of the display screen, resulting in degradation in user friendliness and decrease in operability.

SUMMARY

An advantage of some aspects of the invention is to provide a display apparatus that excels in operability.

The invention can be implemented as the following forms or application examples.

Application Example 1

A display apparatus according to this application example includes a detection section that detects a pointing action, a display section that displays a first image based on the pointing action, a determination section that determines, based on a display direction of the first image in the display section, a display aspect of a second image that allows manipulation of the first image, and a display control section that causes the display section to display the second image based on the display aspect determined by the determination section.

According to the configuration described above, the display apparatus displays the first image based on a pointing action, determines the display aspect of the second image, which allows manipulation of the first image, on the basis of the display direction in which the first image is displayed, and displays the second image on the basis of the determined display aspect. Therefore, since the display aspect of the second image is determined on the basis of the display direction of the first image, the visibility of the second image is improved, whereby the operability of the second image can be improved.

Application Example 2

In the display apparatus according to the application example described above, it is preferable that the determination section determines the display aspect of the second image in such a way that the display direction coincides with an orientation of the first image.

According to the configuration described above, since the second image is so displayed that the orientation thereof coincides with the display direction of the first image, a user can readily issue a manipulation instruction via the second image in the state in which the user directly faces the first image.

Application Example 3

In the display apparatus according to the application example described above, it is preferable that the display control section rotates the second image based on the display aspect and displays the rotated second image in a vicinity of the first image.

According to the configuration described above, since the second image is so displayed in the vicinity of the first image that the orientation of the second image coincide with the display direction of the first image, the visibility of the second image corresponding to the first image is improved.

Application Example 4

In the display apparatus according to the application example described above, it is preferable that at least one of a displayed color, enlargement, reduction, and range specification of the second image is capable of being specified with respect to the first image.

According to the configuration described above, at least one of the displayed color, enlargement, reduction, and range specification of the first image can be specified via the second image.

Application Example 5

In the display apparatus according to the application example described above, it is preferable that, in a case where the first image is formed of a plurality of first images and the plurality of first images are displayed in the display section, the determination section determines the display aspect of the second image based on the first image pointed by the pointing action.

According to the configuration described above, in the case where a plurality of first images are displayed, the display aspect of the second image can be determined on the basis of the first image pointed by the pointing action.

Application Example 6

In the display apparatus according to the application example described above, in a case where the pointing action points one of the plurality of first images, the determination section may determine the display aspect of the second image in such a way that an orientation of the second image coincides with the display direction of the pointed first image.

Application Example 7

In the display apparatus according to the application example described above, in a case where the pointing action points the plurality of first images, the determination section may determine the display aspect of the second image based on directions of the plurality of first images.

Application Example 8

An information processing apparatus according to this application example is an information processing apparatus that processes a first image displayed based on a pointing action, the information processing apparatus including a determination section that determines, based on a display direction of the displayed first image, a display aspect of a second image that allows manipulation of the first image and a display control section that displays the second image based on the display aspect determined by the determination section.

According to the configuration described above, the information processing apparatus determines the display aspect of the second image, which allows manipulation of the first image, on the basis of the display direction in which the first image based on the pointing action is displayed, and displays the second image on the basis of the determined display aspect. Therefore, since the display aspect of the second image is determined on the basis of the display direction of the first image, the visibility of the second image is improved, whereby the operability of the second image can be improved.

Application Example 9

An information processing method according to this application example includes detecting a pointing action, displaying a first image based on the pointing action, determining, based on a display direction of the displayed first image, a display aspect of a second image that allows manipulation of the first image, and displaying the second image based on the determined display aspect.

Since the method described above includes displaying the first image based on a detected pointing action, determining the display aspect of the second image, which allows manipulation of the first image, on the basis of the display direction in which the first image is displayed, and displaying the second image on the basis of the determined display aspect. Therefore, since the display aspect of the second image is determined on the basis of the display direction of the first image, the visibility of the second image is improved, whereby the operability of the second image can be improved.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described below with reference to the drawings.

Embodiment 1

Figure 1:
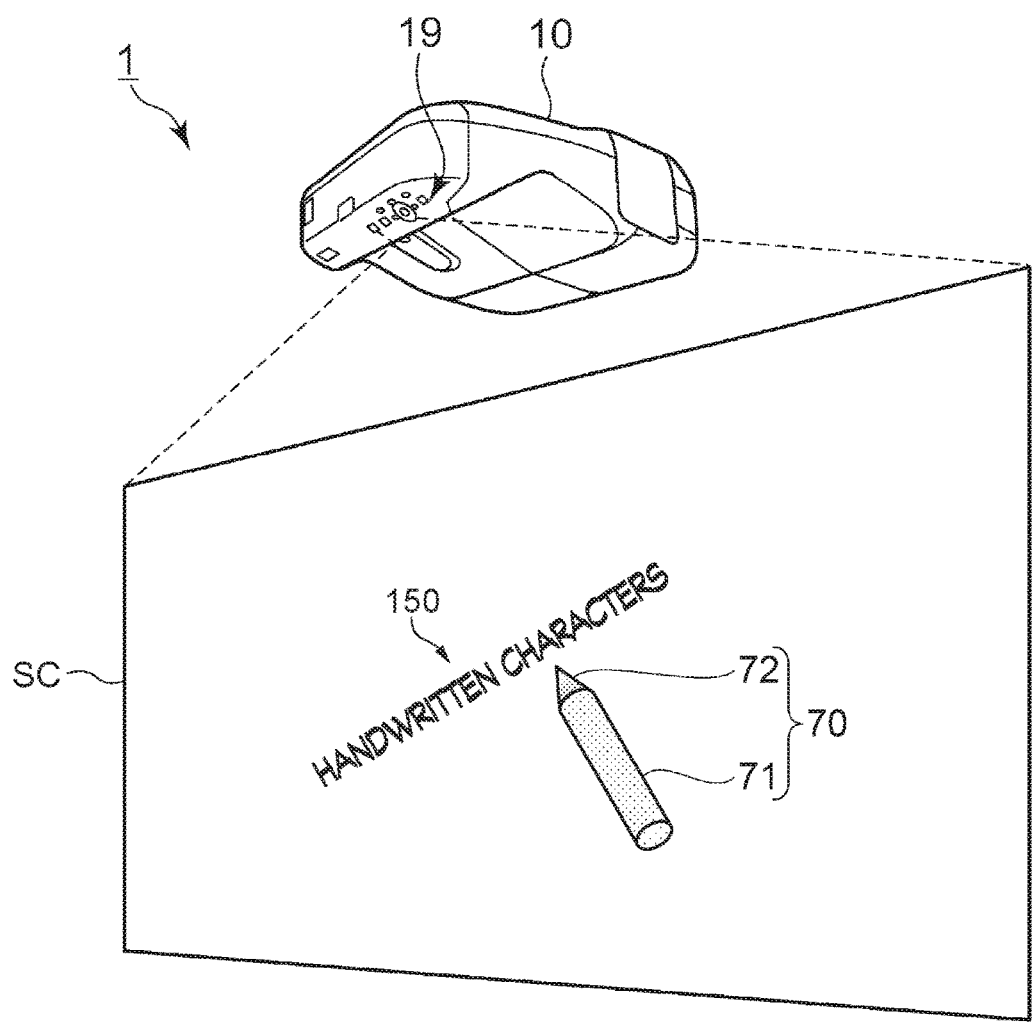
FIG. 1 shows the configuration of a projection system according to Embodiment 1.

FIG. 1 shows the configuration of a projection system 1 according to Embodiment 1 to which the invention is applied. In the present Embodiment 1, the projection system 1 includes a projector 10 as a kind of display apparatus.

In the present Embodiment 1, the projector 10 is a short-focal-length projector that is installed immediately below a screen SC and projects an image obliquely downward. The screen SC illustrated in the present Embodiment 1 is a flat plate or a curtain that is fixed to a wall surface or stands on a floor surface. A wall surface can also be used as the screen SC. In this case, the projector 10 may be attached to an upper portion of the wall surface used as the screen SC.

Instead, it is conceivable that the projector 10 is a table display, that is, an aspect in which the projector 10 is hung from the ceiling for downward projection and projects an image on the screen SC installed on a horizontal surface, such as a table. Another aspect in which the projector 10 is installed in a table and projects an image on a screen SC at the surface of the table from the rear of the screen SC is conceivable. An image projected by the projector 10 does not necessarily have a quadrangular shape defined with straight lines, and an aspect in which the projector 10 projects an image having a circular shape defined with a curved line or a polygonal shape defined with straight lines is also conceivable. For example, it is conceivable to employ an aspect in which the projection surface of the projector 10 hung from the ceiling is the surface of a circular table and users visually recognize an image projected in accordance with the shape of the circular table with the users surrounding the projected image.

The projection system 1 provides an interactive function, that is, a user (operator) uses a pointing element 70 to instruct predetermined operation on the screen SC, on which the projector 10 projects an image.

The pointing element 70 is, for example, a pen-shaped input device and used in such a way that the operator holds a shaft 71 of the pointing element 70 and presses the front end thereof against the screen SC. An operation switch 72, which detects the pressing operation, is provided at the front end of the pointing element 70, and when the operator presses the front end of the pointing element 70 against the screen SC, the operation switch 72 is turned on. The operator can perform position pointing operation by pressing the front end of the pointing element 70 against the screen SC and in an arbitrary position on the screen SC.

The projector 10 has the function of detecting the position of the pointing element 70 on the screen SC, as will be described later. When the operator performs the position pointing operation, the projector 10 detects the position where the front end of the pointing element 70 comes into contact with the screen SC as an operation position.

The projector 10 accepts the position pointing operation performed by the operator's pointing a position with the pointing element 70 and can reflect the operation in a projected image. Specifically, the projector 10 can project, for example, handwritten characters 150, which correspond to a first image, on the screen SC on the basis of the user's drawing action, that is, a pointing action in which the pointing element 70 held by the user is moved with the pointing element 70 pressed against the screen SC.

For example, in FIG. 1, when the operator moves the pointing element 70 relative to the screen SC from a lower left position toward an upper right position, the handwritten characters 150 are drawn on the screen SC in the oblique direction from the lower left position toward the upper right position.

When the front end of the pointing element 70 is pressed against the screen SC, the projector 10 determines that a drawing action is initiated. When the front end of the pointing element 70 is moved away from the screen SC and a predetermined period elapses, the projector 10 determines that the drawing action is completed.

The projector 10 can save an image drawn by the drawing action as image data.

Figure 2:
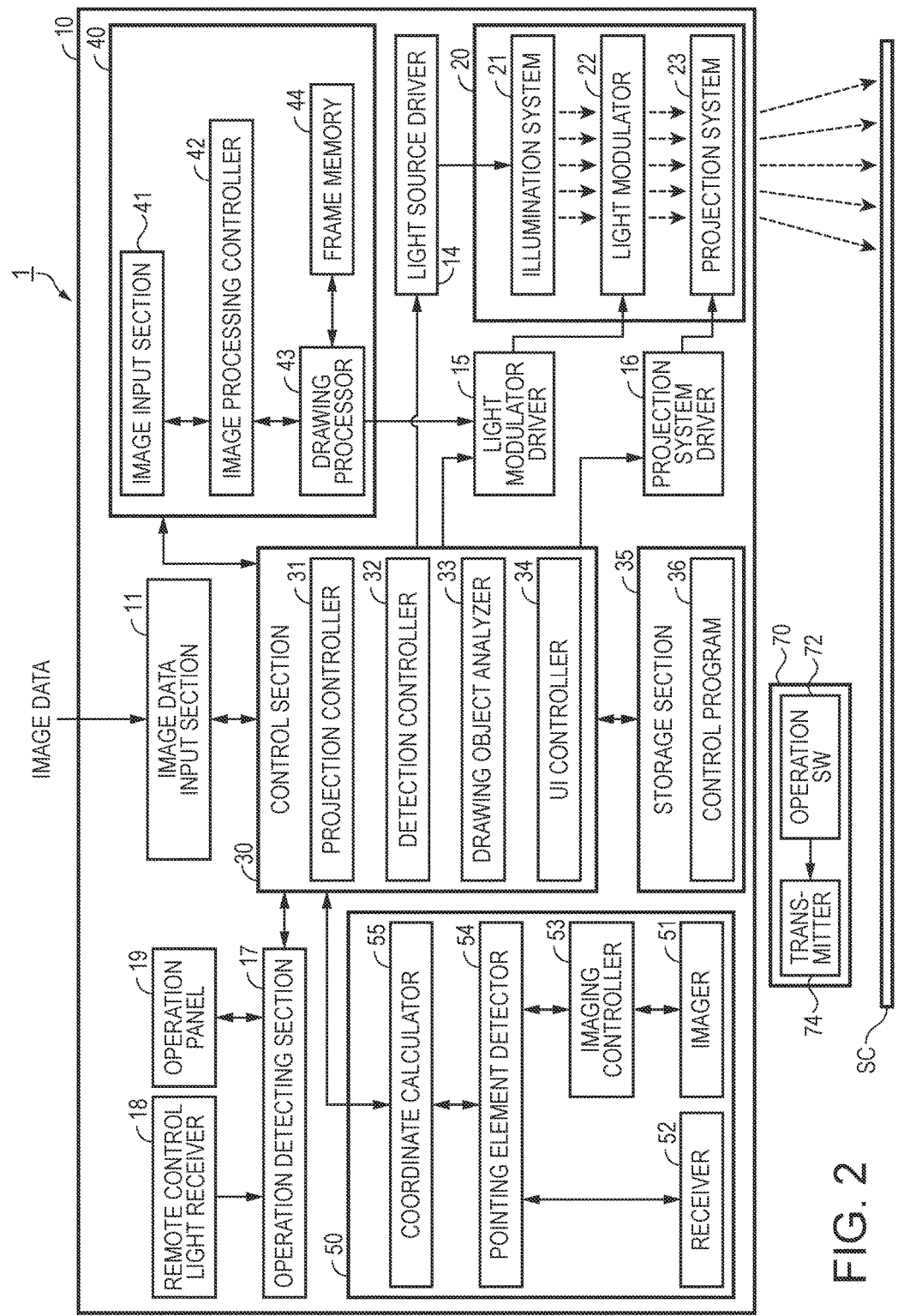
FIG. 2 is a functional block diagram showing functional portions that form a projector.

FIG. 2 is a functional block diagram of portions that form the projector 10.

The projector 10 includes an image data input section 11, to which image data is inputted.

The image data input section 11 may, for example, be a USB interface, or a communication interface, such as a wired or wireless LAN interface. For example, a server apparatus or another projector may be connected to a LAN interface provided in the image data input section 11.

The image data input section 11 may include an image input terminal to which an analog video signal or digital image data is inputted. The image input terminal is, for example, a VGA terminal, a DVI (digital visual interface) terminal, an S video terminal, an RCA terminal, a D terminal, an HDMI connector compliant with the HDMI (registered trademark) standard. The image data input section 11 may include an interface circuit and an image processing circuit corresponding to the image input terminals. The image data input section 11 may further have a reading function of reading image data stored, for example, in a flash memory.

The projector 10 can be broadly divided into a projection section 20, which forms an optical image, and an image processing system that processes image data.

The projection section 20 corresponds to a display section that displays an image and includes an illumination system 21, a light modulator 22, and a projection system 23. The illumination system 21 includes a light source formed, for example, of a xenon lamp, an ultrahigh-pressure mercury lamp, an LED (light emitting diode), or a laser light source. The illumination system 21 may further include a reflector and an auxiliary reflector that guide light emitted from the light source to the light modulator 22. Further, although not shown, the illumination system 21 may still further include, for example, a lens group for enhancing optical characteristics of projection light, a polarizer, or a light adjusting element that is disposed in the path to the light modulator 22 and attenuates the amount of light emitted from the light source.

The light modulator 22 includes, for example, three transmissive liquid crystal panels corresponding to the RGB three primary colors and modulates light passing through the liquid crystal panels to generate image light. The light from the illumination system 21 is separated into RGB three color light fluxes, which are incident on the corresponding liquid crystal panels. The color light fluxes having been modulated by the liquid crystal panels and having passed therethrough are combined with one another by alight combining system, such as a cross dichroic prism, and the combined light is outputted to the projection system 23.

The projection system 23 includes a zoom lens that enlarges and reduces an image to be projected and performs focal point adjustment, a zoom adjustment motor that adjusts the degree of zooming, a focus adjustment motor that adjusts focusing, a concave mirror that reflects projection light toward the screen SC, and other components. The projection system 23 performs the zoom adjustment and focus adjustment on the image light modulated by the light modulator 22, guides the light having passed through the lens group toward the screen SC via the concave mirror, and forms an image on the screen SC.

A projection system driver 16 and a light source driver 14 are connected to the projection section 20. The projection system driver 16 drives the motors provided in the projection system 23 under the control of a control section 30, and the light source driver 14 drives the light source provided in the illumination system 21 under the control of the control section 30. The specific configuration of the projection system 23 is not limited to the configuration described above and can, for example, instead be an image formation configuration using no concave mirror or any other mirror but using a lens to project the light modulated by the light modulator 22 on the screen SC.

On the other hand, the image processing system primarily includes the control section 30, which controls the entire projector 10, and further includes a storage section 35, an operation detecting section 17, an image processing section 40, and a light modulator driver 15. The storage section 35 stores a control program 36 executed by the control section 30 and data processed by the control section 30. The image processing section 40 processes an input image inputted via the image data input section 11 and drives the light modulator 22 on the basis of an image signal processed by the image processing section 40 to cause the light modulator 22 to perform drawing.

The operation detecting section 17 is connected to a remote control light receiver 18 and an operation panel 19 and detects operation received via the remote control light receiver 18 and the operation panel 19.

The remote control light receiver 18 receives an infrared signal transmitted in response to button operation from a remote control (not shown) used by the operator of the projector 10. The remote control light receiver 18 decodes the infrared signal received from the remote control, generates operation data representing the content of the operation performed on the remote control, and outputs the operation data to the control section 30.

The operation panel 19 is provided on an exterior enclosure of the projector 10 and includes a variety of switches and indicator lamps. The operation detecting section 17 causes the indicator lamps on the operation panel 19 to illuminate or blink as appropriate under the control of the control section 30 and in accordance with the action state and setting state of the projector 10. When any of the switches on the operation panel 19 is operated, operation data corresponding to the operated switch is outputted from the operation detecting section 17 to the control section 30.

The control section 30 outputs image data inputted from the image data input section 11 to the image processing section 40.

The image processing section 40 includes an image input section 41, an image processing controller 42, a drawing processor 43, and a frame memory 44.

The image input section 41 buffers the inputted image data.

The image processing controller 42 performs a variety of types of conversion as appropriate, such as interlace/progressive conversion, resolution conversion, and color conversion, on the image data inputted to the image input section 41 to generate image data having a preset format.

The drawing processor 43 develops images on a frame basis in the frame memory 44 on the basis of the image data processed by the image processing controller 42.

The image data developed in the frame memory 44 is outputted to the light modulator driver 15. The drawing processor 43 may perform trapezoidal distortion correction and pin-cushion distortion correction on the image data developed in the frame memory 44. In this case, the drawing processor 43 deforms the shape expressed by the image data developed in the frame memory 44, for example, to a trapezoidal shape that compensates trapezoidal distortion. The drawing processor 43 further edits the images developed in the frame memory 44, specifically, adds an image of a figure or any other image to the developed images or deletes the added image from the developed images in accordance with the coordinates of the operation position of the pointing element 70 in an action mode in which the projector 10 performs drawing to generate an image or update an image. An image according to operation of the pointing element 70 is thus drawn and projected on the screen SC.

The pointing element 70 includes a transmitter 74, which outputs an infrared signal in addition to the operation switch 72. The transmitter 74 includes an infrared LED or any other light emitter, a light emission control circuit, a power supply, and other components. The transmitter 74 periodically transmits the infrared signal in the power-on state of the pointing element 70. The transmitter 74 modulates the infrared signal in accordance with the operation state of the operation switch 72 (on/off) and transmits data representing on/off of the operation switch 72 in accordance with a method compliant, for example, with the IrDA standard.

The projector 10 includes a position detecting section 50 as a detection section that detects a pointing action of the pointing element 70. The position detecting section 50 includes an imager 51, a receiver 52, an imaging controller 53, a pointing element detector 54, and a coordinate calculator 55.

The imager 51 includes an imaging optical system, an imaging device, an interface circuit, and other components and performs imaging in the projection direction of the projection system 23. The imaging optical system of the imager 51 is so disposed that the projection system 23 and the imaging optical system are oriented in the same direction, and the imaging optical system has a viewing angle that covers the range over which the projection system 23 projects an image on the screen SC. Examples of the imaging device may include a CCD and a CMOS device. The interface circuit reads and outputs detection values from the imaging device.

The imaging controller 53 causes the imager 51 to perform imaging to generate captured image data. When the imager 51 performs imaging under the control of the imaging controller 53, an image projected on the screen SC and the pointing element 70 operated on the screen SC or in the vicinity thereof is captured. In the present Embodiment 1, the imaging device of the imager 51 has sensitivity to a wavelength region to which infrared light belongs. The imager 51 outputs captured image data on the infrared light collected by the imaging optical system.

The imaging section 51 may have sensitivity to the wavelength region to which visible light belongs. Further, the imaging target is not limited to the pointing element 70, and the operator's hand or finger may be imaged.

The receiver 52 receives and decodes the infrared signal transmitted by the transmitter 74 and outputs received data. The received data outputted by the receiver 52 contains data representing the operation state of the operation switch 72.

The pointing element detector 54 detects the position of the pointing element 70 on the basis of the captured image data generated by the imaging controller 53. The pointing element detector 54 carries out the process of detecting a shape similar to the shape of the pointing element 70 in the captured image data and cutting the image of the pointing element 70 from the captured image data to identify the position of the pointing element 70 in the captured image data. In this process, the pointing element detector 54 may identify the direction in which the front end of the pointing element 70 is oriented. The pointing element detector 54 further detects the operation state of the operation switch 72 on the basis of the received data outputted by the receiver 52. The method for detecting the pointing element 70 is not limited to the method for detecting a shape similar to the shape of the pointing element 70, and a method for detecting light reflected off a light curtain is conceivable.

The method for detecting light reflected off a light curtain may include, for example, outputting layer-shaped (or curtain-shaped) detection light (infrared light, for example) to the entire surface of the screen SC, imaging the light reflected off the pointing element 70 having a portion that reflects infrared light, and detecting the position of the pointing element 70 on the basis of the position of the reflected light in the captured image. The method for detecting light reflected off a light curtain is not described in detail because it does not fall within the substance of the invention (see, for example, JP-A-2015-159523 for the method).

The coordinate calculator 55 calculates the coordinates of the position pointed by the front end of the pointing element 70 on the screen SC, that is, the coordinates of the operation position on the basis of the position where the pointing element 70 is located in the captured image data and which is detected by the pointing element detector 54. Specifically, the coordinate calculator 55 calculates the coordinates defined in the area where the projection section 20 projects a projection image (projection range) on the screen SC on the basis of the operation position in the captured image data. The coordinate calculator 55 outputs data representing the calculated coordinates of the operation position, the operation state of the operation switch 72, and other pieces of information to the control section 30. The coordinate calculator 55 may further output the captured image data produced by the imager 51 to the control section 30.

The control section 30 reads and executes the control program 36 stored in the storage section 35 to achieve the functions of a projection controller 31, a detection controller 32, a drawn object analyzer 33, and a UI controller 34 to control the portions that form the projector 10.

The control section 30 includes a CPU (central processing unit), a ROM (read only memory), a DRAM (dynamic random access memory), and other components, neither of which is shown, reads a basic control program stored in the ROM into the DRAM, and causes the CPU to execute the program to control the projector 10. The control section 30 further executes the program stored in the storage section 35 to function as the projection controller 31, the detection controller 32, the drawn object analyzer 33, and the UI controller 34.

The projection controller 31 acquires the content of operation performed by the operator on the basis of operation data inputted from the operation detecting section 17. The projection controller 31 controls the image processing section 40, the light modulator driver 15, the projection system driver 16, and the light source driver 14 in accordance with the operation performed by the operator to cause them to project an image on the screen SC. The projection controller 31 further controls the projection system driver 16 to cause the projection system 23 to perform focus adjustment, zoom adjustment, diaphragm adjustment, and other types of adjustment.

The detection controller 32 controls the position detection section 50 to cause it to detect the operation position of the pointing element 70 and detects the coordinates of the operation position and the operation state of the operation switch 72.

The detection controller 32 further provides a predetermined function relating to drawing on the basis of the operation position of the pointing element 70 and the operation state of the operation switch 72. For example, in a case where a menu (not shown) is so projected on the screen SC as to overlap with an image on the screen SC in response to the operator's operation of the remote control, and the operator uses the pointing element 70 to select a character drawing function from options in the projected menu, the detection controller 32 may activate the character drawing function that allows the operator to draw the handwritten characters 150 on the basis of the position pointed by the pointing element 70.

The drawn object analyzer 33 analyzes characters, a figure, or any other object drawn on the screen SC by the operator's operation of the pointing element 70. For example, in a case where the character drawing function is activated, and the handwritten characters 150 are drawn as an object on the screen SC, the drawn object analyzer 33 analyzes the drawn handwritten characters 150 to detect the drawing direction in which the handwritten characters 150 are drawn on the screen SC. The drawing direction represents the direction in which the handwritten characters 150 are written and coincides with the display direction in which the handwritten characters 150 are displayed on the screen SC.

A method for detecting the drawing direction of the handwritten characters 150 may include, for example, extracting an image corresponding to the first character of the handwritten characters 150, extracting the character from the extracted image by using a known optical character recognition technology (OCR technology), and calculating the inclination of the extracted character by using rotation correction.

The drawn object analyzer 33 determines the drawing direction of the handwritten characters 150 on the basis of the calculated inclination of the character.

The drawn object analyzer 33 may instead handle the handwritten characters 150 or any other figure as a schematic representation, calculate the direction vector of the schematic representation on the basis of the group of pixels that forms the schematic representation, and determine the drawing direction on the basis of the calculated direction vector.

Still instead, in a case where the operator holds the pointing element 70 and draws an object, the drawn object analyzer 33 may determine the drawing direction on the basis of the inclination angle of the pointing element 70 imaged by the imager 51. In this case, information on a habit or a practice that appears when the operator holds the pointing element 70 and performs drawing may be stored in the storage section 35 on an operator basis, and the inclination angle of the pointing element 70 may be corrected in accordance with the individual operators.

The UI controller 34 controls the position and inclination of a user interface screen (UI screen) 160, which is projected on the screen SC, on the basis of a result of the analysis performed by the drawn object analyzer 33. The UI screen 160 has the function of allowing predetermined operation to be performed on the handwritten characters 150 and corresponds to a second image.

When drawing operation using the character drawing function is completed, the UI controller 34 calculates the angle of rotation by which the UI screen 160 is so inclined that the orientation of the UI screen 160 coincides with the drawing direction of the handwritten characters 150 and projects the UI screen 160 in the vicinity of the handwritten characters 150 with the UI screen 160 rotated on the basis of the calculated angle of rotation. Out of the functions of the UI controller 34, the function of determining the angle of rotation, which is one of display aspects, with respect to the drawing direction of the handwritten characters 150 corresponds to a determination section, and the function of projecting the UI screen 160 rotated on the basis of the angle of rotation corresponds to a display control section. The display aspect to be determined with respect to the drawing direction of the handwritten characters 150 is not limited only to the angle of rotation. For example, in accordance with the drawing direction of the handwritten characters 150, the function selectable in the UI screen 160 may be changed. As an example of the above, in a case where the drawing direction of the handwritten characters 150 inclines with respect to the direction parallel to the edges of the screen, the following aspect is also conceivable as the function of the UI screen 160: The function of resetting the inclination of the drawing direction of the handwritten characters 150 can be selected.

Figure 3:
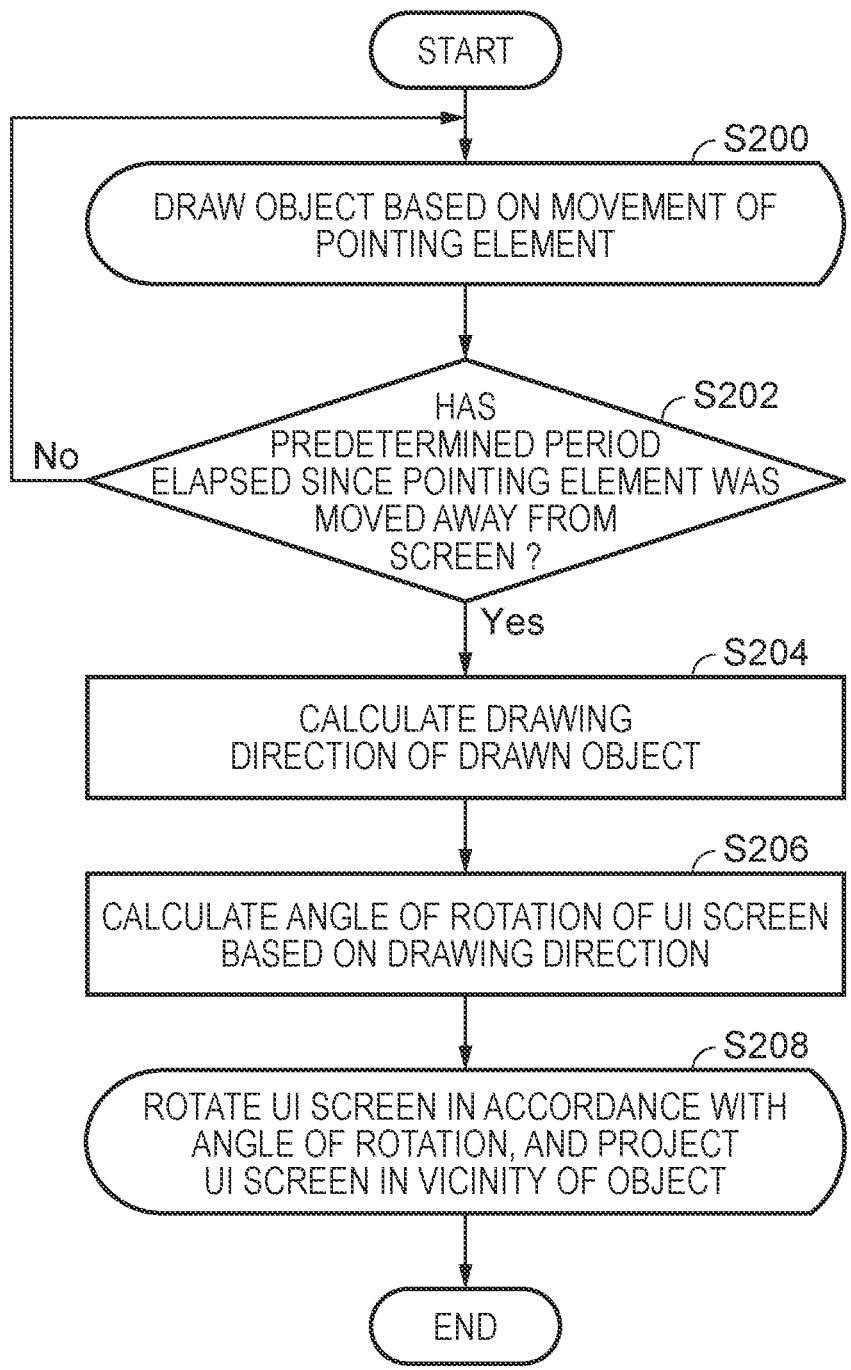
FIG. 3 is a flowchart showing the procedure of a process carried out when a character drawing function is activated.

FIG. 3 is a flowchart showing the procedure of a process (information processing method) carried out when the character drawing function is activated.

When the process starts, the control section 30 draws an object on the screen SC on the basis of the operator's moving of the pointing element 70 (step S200).

The control section 30 then evaluates whether or not a predetermined period has elapsed since the pointing element 70 was moved away from the screen SC (step S202).

In a case where the predetermined period has not elapsed since the pointing element 70 was moved away from the screen SC (No in step S202), the control returns to step S200, and the character drawing function continues.

On the other hand, in a case where the predetermined period has elapsed since the pointing element 70 was moved away from the screen SC (Yes in step S202), the control section 30 calculates the drawing direction of the drawn object (step S204).

The control section 30 then calculates the angle of rotation of the UI screen 160 on the basis of the calculated drawing direction (step S206).

The control section 30 then rotates the UI screen 160 in accordance with the angle of rotation, projects the UI screen 160 in the vicinity of the object and within a predetermined distance from the object (step S208), and terminates the series of steps.

Examples of the projection of the UI screen 160 will next be described with reference to FIGS. 4 to 13.

Figure 4:
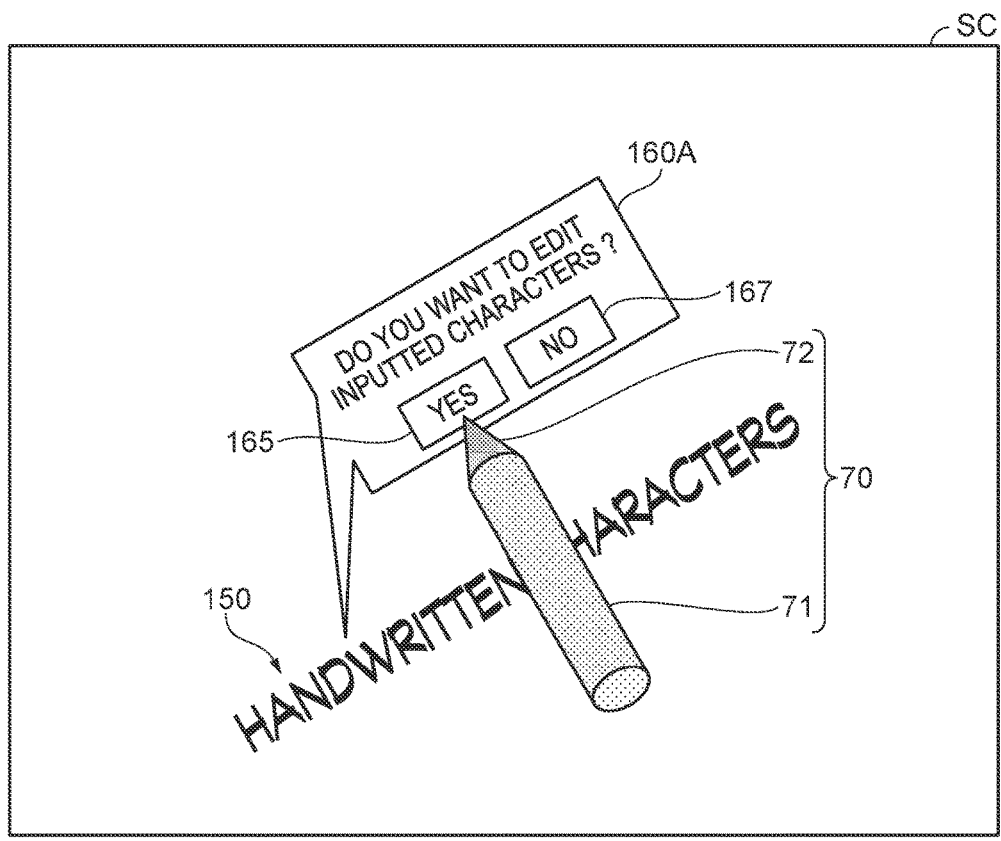
FIG. 4 shows a first UI screen projected on a screen.

FIG. 4 shows a first UI screen 160A projected on the screen SC when a drawing action using the character drawing function is completed.

In a case where the operator operated the pointing element 70 to draw the handwritten characters 150, and a predetermined period has then elapsed since the operator moved the pointing element 70 away from the screen SC, the detection controller 32 determines that the drawing action using the character drawing function has been completed. The UI controller 34 receives the determination of the completion from the detection controller 32 and projects the first UI screen 160A in the vicinity of the handwritten characters 150. In this case, the UI controller 34 rotates the first UI screen 160A in such a way that the orientation of the first UI screen 160A coincides with the drawing direction of the handwritten characters 150.

The first UI screen 160A is a screen that asks the operator whether or not the operator desires to edit the drawn handwritten characters 150. In a case where the operator desires to edit the handwritten characters 150, the operator selects a Yes button 165 by pointing it with the pointing element 70. On the other hand, in a case where the operator does not desire to edit the handwritten characters 150, the operator selects a No button 167 by pointing it with the pointing element 70.

Figure 5:
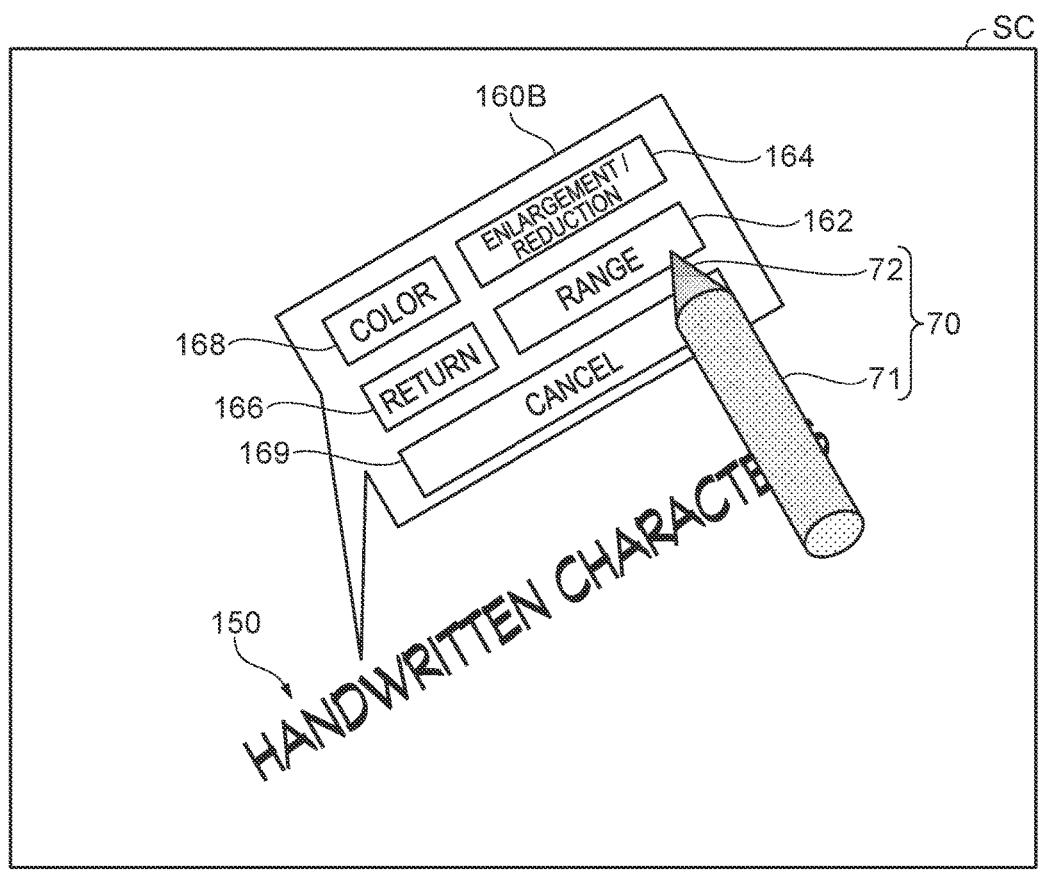
FIG. 5 shows a second UI screen projected on the screen.

FIG. 5 shows a second UI screen 160B to be projected on the screen SC in the case where the Yes button 165 is selected in the projected first UI screen 160A.

In this case, the UI controller 34 projects the second UI screen 160B, in place of the first UI screen 160A being projected, in the vicinity of the handwritten characters 150. In this case, the UI controller 34 rotates the second UI screen 160B in such a way that the orientation of the second UI screen 160B coincides with the drawing direction of the handwritten characters 150.

The second UI screen 160B is a screen that prompts the operator to select the content of the editing performed on the handwritten characters 150. The second UI screen 160B has a range selection button 162, an enlargement/reduction selection button 164, a return button 166, a color selection button 168, and a cancel button 169, each of which is a button that can issue an instruction when selected.

The range selection button 162 is a button for setting the range within which the handwritten characters 150 are edited. The enlargement/reduction button 164 is a button for enlarging or reducing the handwritten characters 150. The return button 166 is a button that provides an undo function, that is, a button for canceling the action of editing performed by using the second UI screen 160B to restore the previous state. The color selection button 168 is a button for changing the displayed color of the handwritten characters 150. The cancel button 169 is a button for stopping editing operation using the second UI screen 160B.

Figure 6:
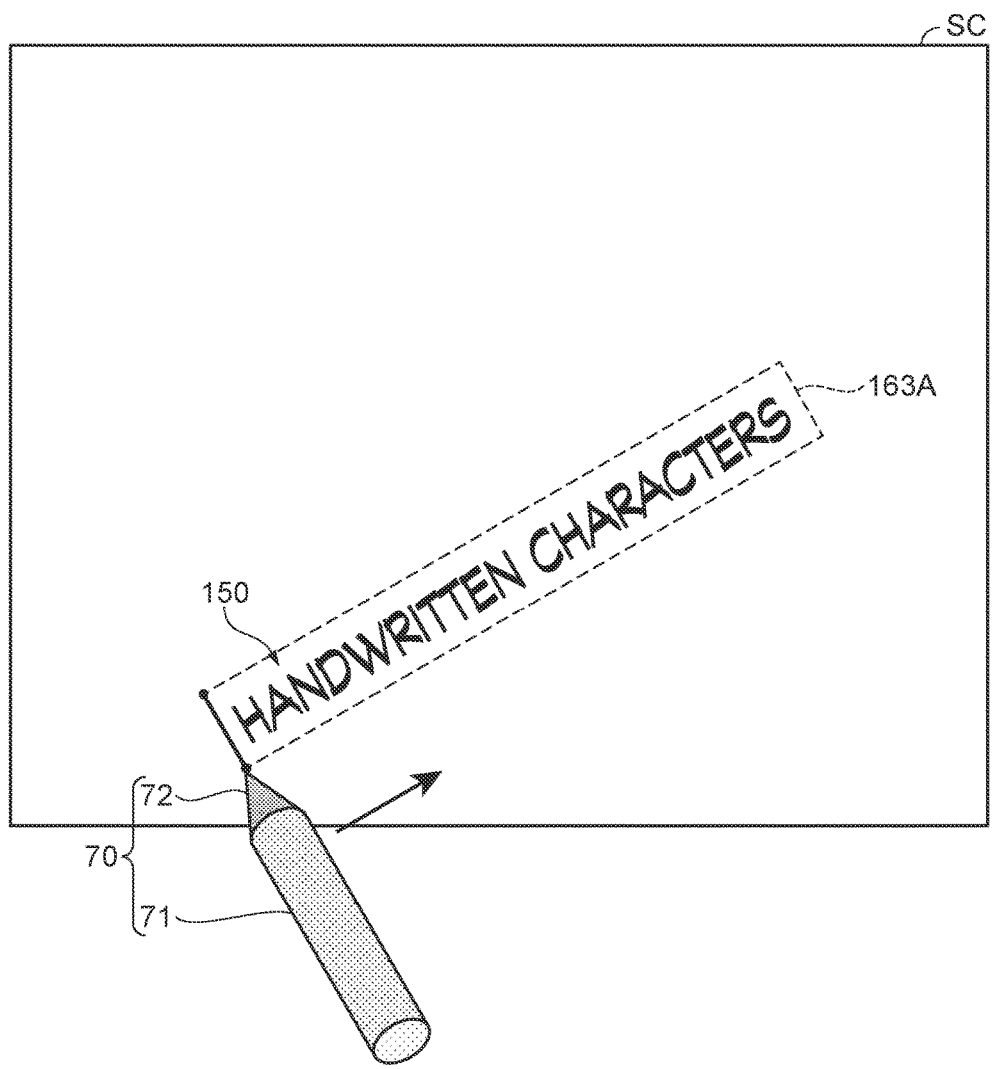
FIG. 6 shows a screen projected on the screen in a case where a range selection button is selected.

FIG. 6 shows a screen projected on the screen SC in a case where the range selection button 162 is selected in the projected second UI screen 160B.

The UI controller 34 projects a range specifying window 163A, in place of the second UI screen 160B being projected, in the vicinity of the handwritten characters 150. In this case, the UI controller 34 projects the range specifying window 163A in such a way that the orientation of the range specifying window 163A coincides with the drawing direction of the handwritten characters 150 and the rectangle that forms the range specifying window 163A surrounds the entire handwritten characters 150.

The operator can change the range specified by the range specifying window 163A by pointing and moving one edge of the rectangle that forms the range specifying window 163A.

Figure 7:
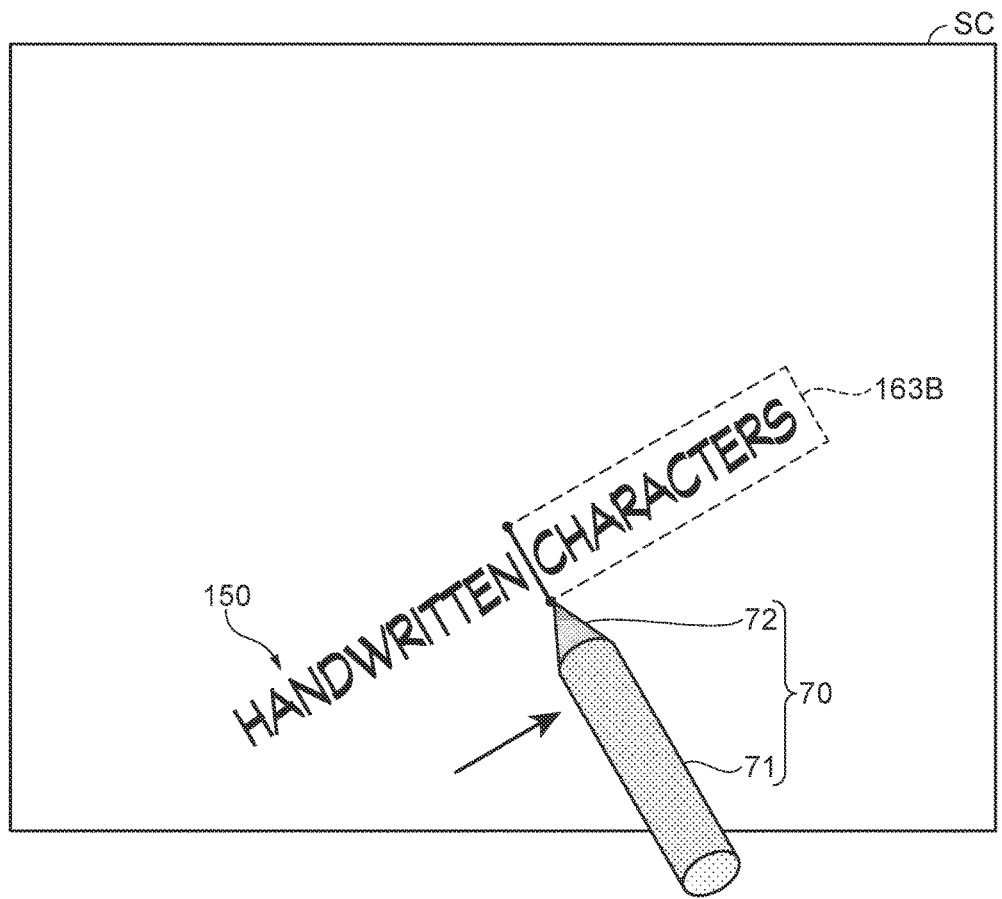
FIG. 7 shows an example in which the range of part of handwritten characters is specified.

FIG. 7 shows an example in which the range of part of the handwritten characters 150 is specified by a range specifying window 163B.

That is, FIG. 7 shows that one edge of the rectangle that forms the range specifying window 163A has been so moved that part of the handwritten characters 150 (in this case "handwritten") is excluded from the range. It is noted that the operator can point and move any of the four edges that form the rectangle.

Figure 8:
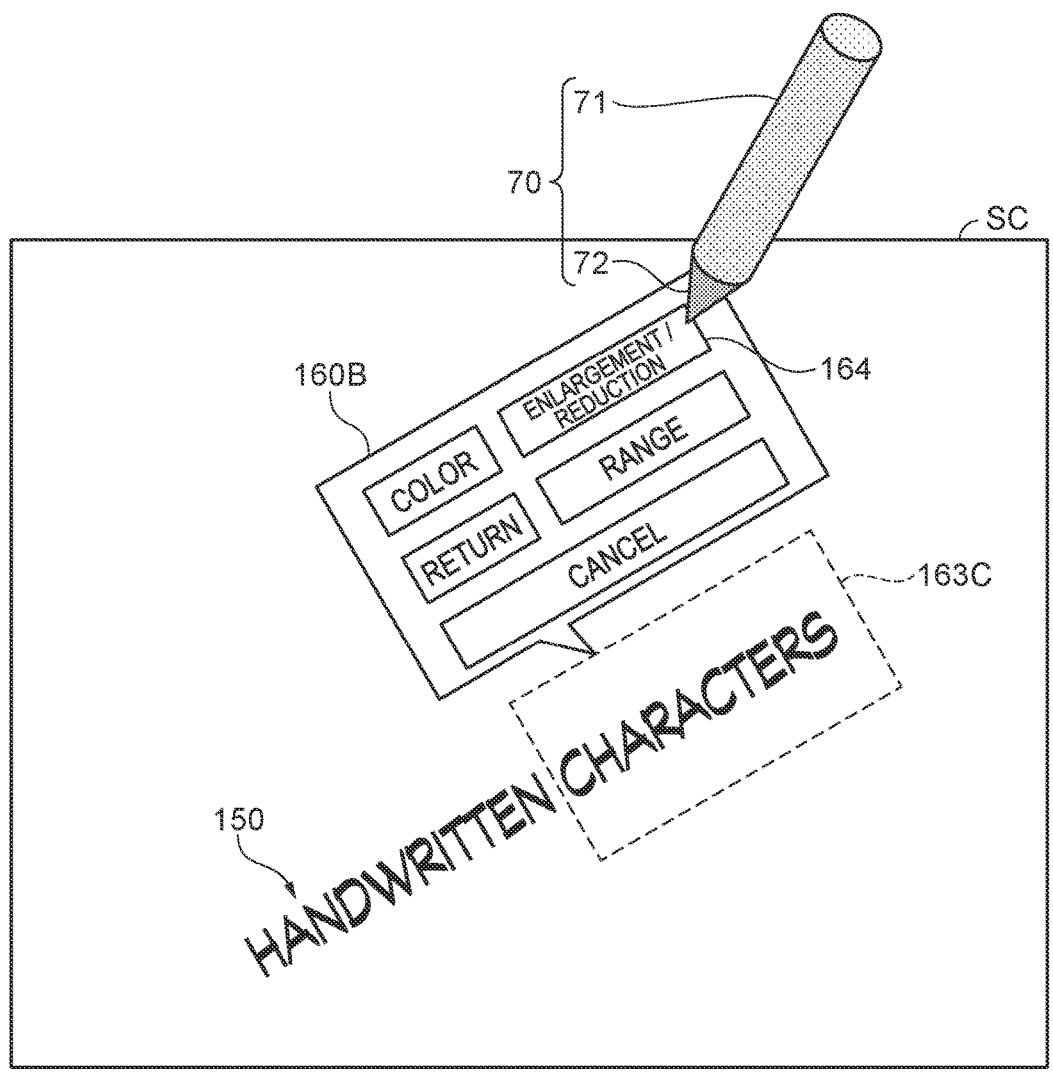
FIG. 8 shows an instruction of enlargement of part of the handwritten characters.

FIG. 8 shows a case where part of the handwritten characters 150 is enlarged. The operator can specify part of the handwritten characters 150 (in this case "characters") as a range and point a vertex of the rectangle to move the vertex in an arbitrary direction to specify the size of the rectangle, that is, the factor of enlargement or reduction of the characters, as indicated by a range specifying window 163C. After the pointing element 70 is moved away from the screen SC and a predetermined period elapses, the UI controller 34 senses that the range specifying operation has been completed and projects the second UI screen 160B in the vicinity of the handwritten characters 150 in such a way that the orientation of the second UI screen 160B coincides with the drawing direction of the handwritten characters 150. At this point, the operator selects the enlargement/reduction selectin button 164 in the second UI screen 160B.

Figure 9:
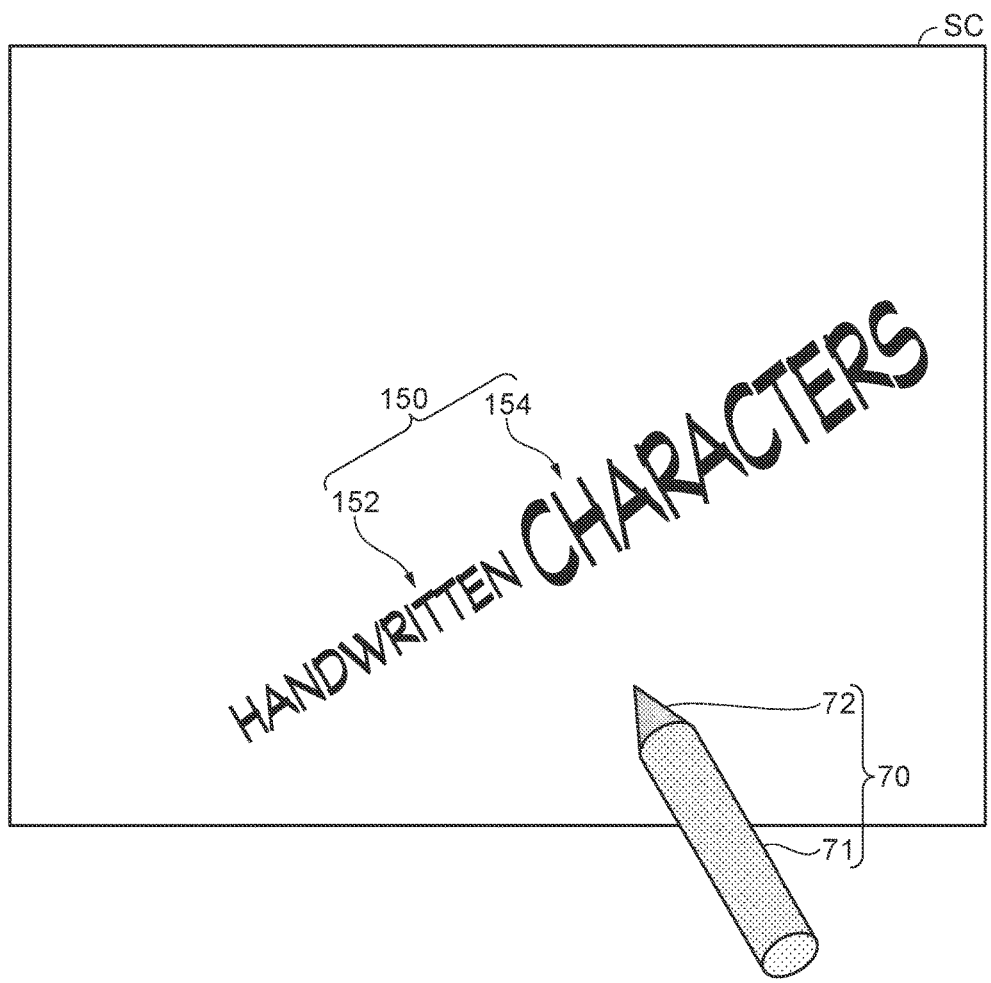
FIG. 9 shows that the part of the handwritten characters is enlarged.

As a result, a specified portion 154, which is part of the handwritten characters 150 and contained in the range specified by the range specifying window 163C, is enlarged in accordance with the size of the range specifying window 163C, as shown in FIG. 9. On the other hand, the size of a non-specified portion 152, which is part of the handwritten characters 150 and is not specified by the range specifying window 163C, does not change.

The case where the enlargement/reduction button 164 is selected has been described above. In a case where the color selection button 168 is selected, for example, a color specifying window (not shown) is projected in place of the range specifying window 163A, and when the operator selects a desired color in the color specifying window, the color of the characters in a predetermined area of the specified range of the handwritten characters 150 is changed to the desired color.

Figure 10:
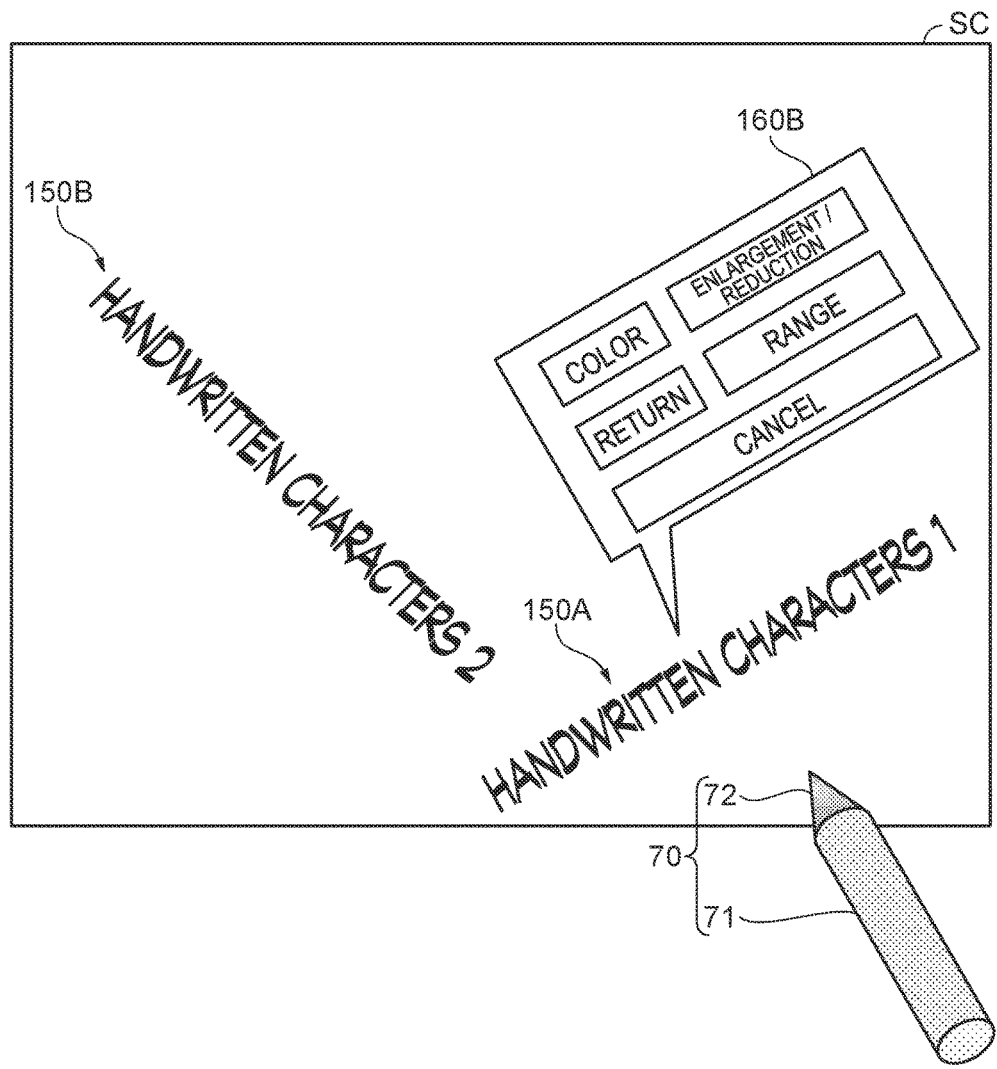
FIG. 10 shows an example of projection of a UI screen in a case where a plurality of sets of handwritten characters are drawn.
Figure 11:
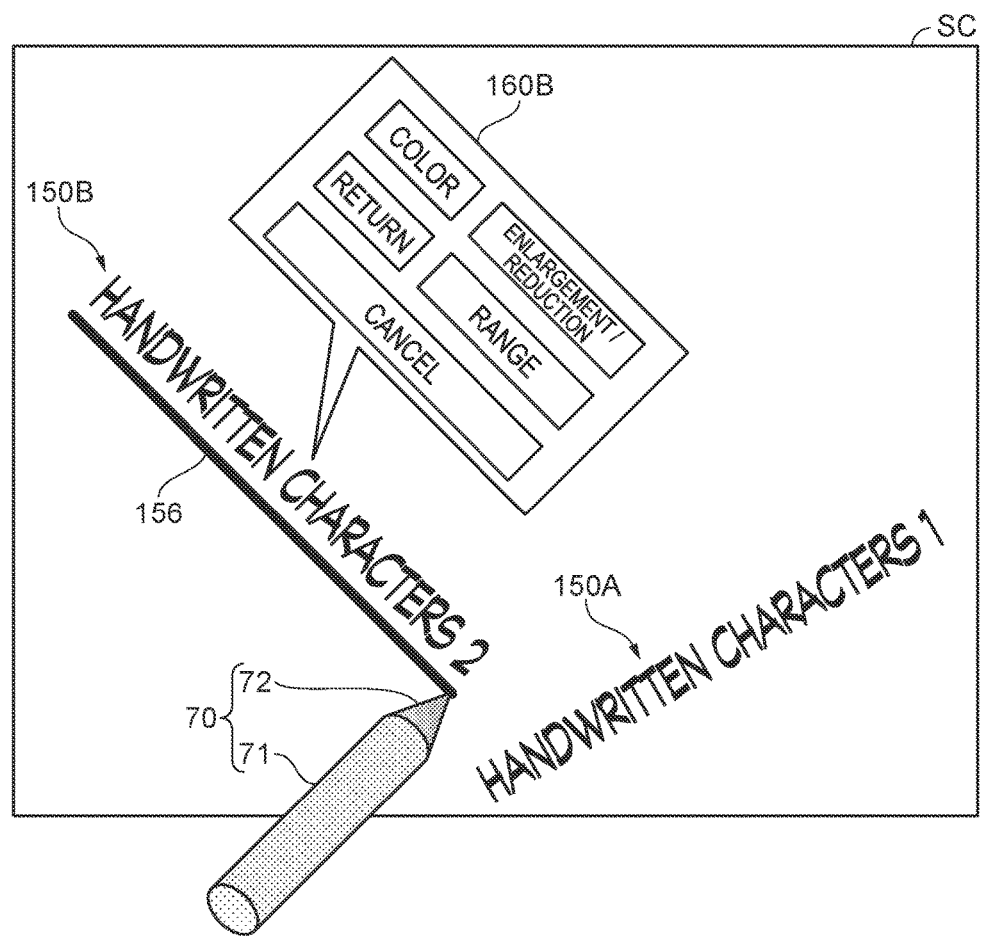
FIG. 11 shows an example in which an underline is drawn below handwritten characters.

FIG. 10 shows Example 1 of the projection of the second UI screen 160B in a case where a plurality of sets of handwritten characters 150A and 150B are drawn by using the character drawing function. In this case, it is assumed that a first operator first draws the handwritten characters 150B, and a second operator then draws the handwritten characters 150A. In this case, when a predetermined period has elapsed since the handwritten characters 150A were drawn and the pointing element 70 was moved away from the screen SC, the UI controller 34 projects the second UI screen 160B, which follows the first UI screen 160A, in the vicinity of the handwritten characters 150A in such a way that the orientation of the second UI screen 160B coincides with the drawing direction of the handwritten characters 150A.

In a case where the operator draws an underline 156 below the handwritten characters 150B, the UI controller 34 projects the second UI screen 160B in the vicinity of the handwritten characters 150B in such a way that the orientation of the second UI screen 160B coincides with the drawing direction of the underline 156. The drawing direction may coincide with the drawing direction of the handwritten characters 150B, which is an object closest to the drawn underline 156.

Figure 12:
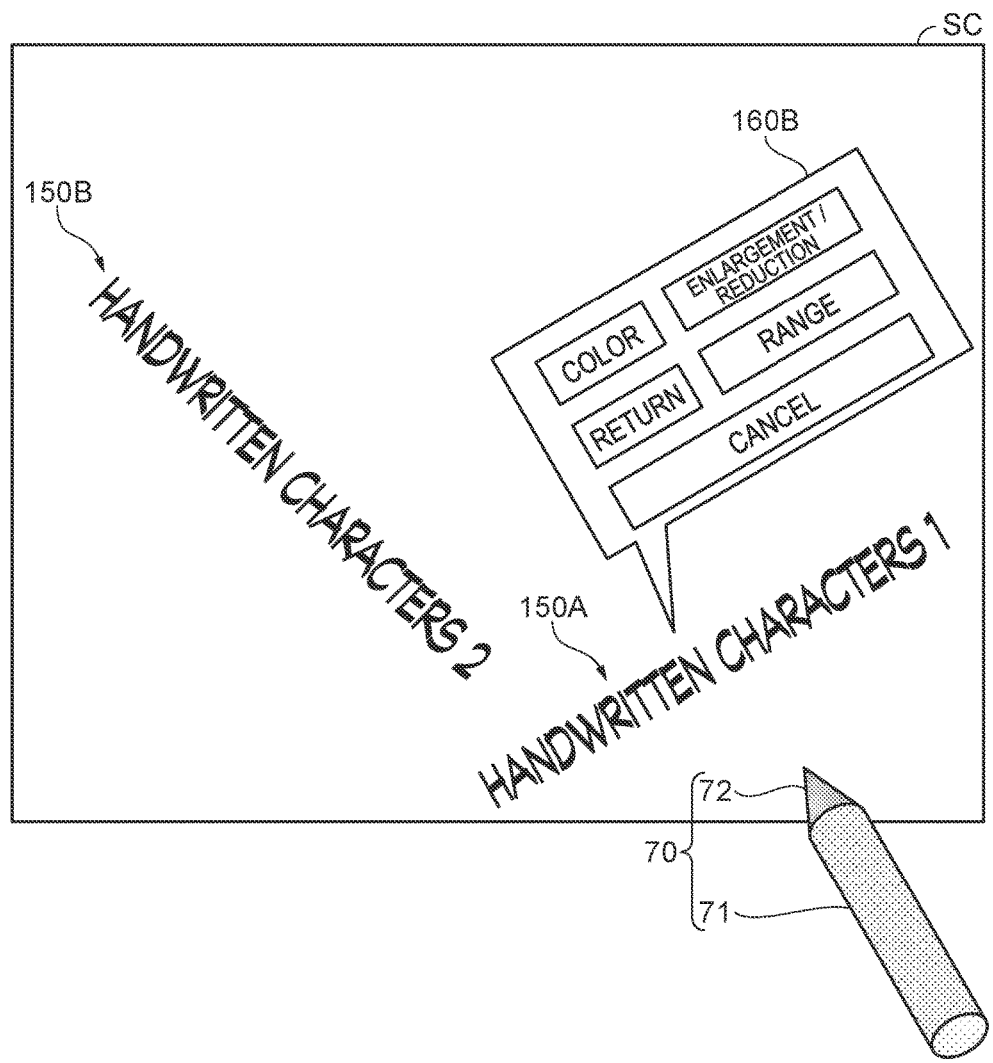
FIG. 12 shows another example of the projection of a UI screen in a case where a plurality of sets of handwritten characters are drawn.
Figure 13:
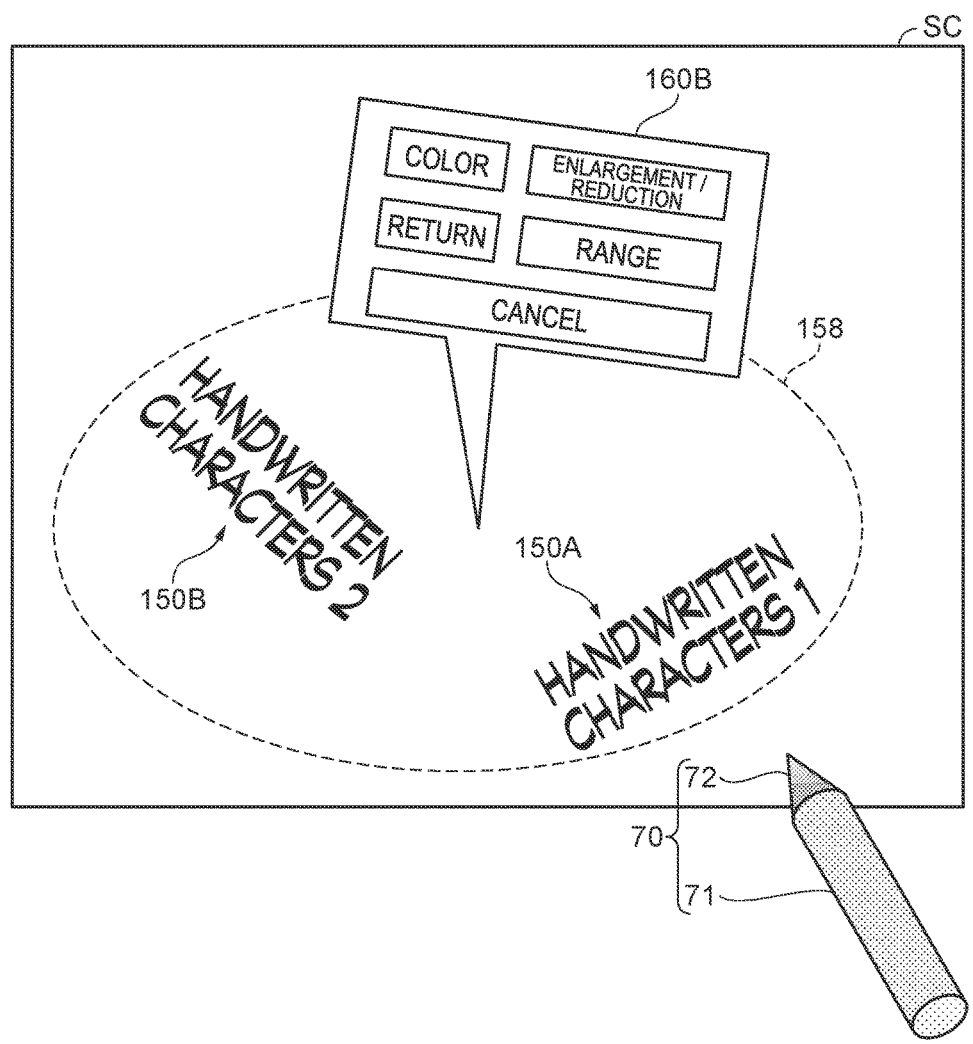
FIG. 13 shows an example in which a closed area containing a plurality of sets of handwritten characters is drawn.

FIG. 12 shows Example 2 of the projection of the second UI screen 160B in the case where the plurality of sets of handwritten characters 150A and 150B are drawn by using the character drawing function.

In this case, it is assumed that the handwritten characters 150B are first drawn, and the handwritten characters 150A are then drawn. In this case, when a predetermined period has elapsed since the handwritten characters 150A were drawn and the pointing element 70 was moved away from the screen SC, the UI controller 34 projects the second UI screen 160B, which follows the first UI screen 160A, in the vicinity of the handwritten characters 150A in such a way that the orientation of the second UI screen 160B coincides with the drawing direction of the handwritten characters 150A.

In a case where the operator draws a closed area 158, which contains the handwritten characters 150A and the handwritten characters 150B, with the pointing element 70, the UI controller 34 draws the first UI screen 160A and the second UI screen 160B on the basis of the positions of objects contained in the closed area 158, such as the handwritten characters 150A and the second handwritten characters 150B.

In this case, the second UI screen 160B may be drawn in the position of the center of gravity of the objects as a whole contained in the closed area 158 or in a position in the vicinity of an object closest to the center of gravity of the closed area 158 (handwritten characters 150A, for example). The angle of rotation of each of the first UI screen 160A and the second UI screen 160B may be obtained from the combination of the drawing directions of the objects. The angle of rotation may instead coincide with the drawing direction of an object closest to the center of gravity of the objects as a whole.

According to Embodiment 1 described above, the following advantageous effects are provided.

(1) The projector 10 projects and displays the handwritten characters 150, which are drawn on the basis of a pointing action using the pointing element 70, on the screen SC, determines the drawing direction of the UI screen 160, which allows manipulation of the handwritten characters 150, on the basis of the drawing direction of the handwritten characters 150 displayed on the screen SC, and displays the UI screen 160 on the screen SC on the basis of the determined drawing direction. Therefore, since the drawing direction of the UI screen 160 is determined on the basis of the drawing direction of the handwritten characters 150, the visibility of the UI screen 160 to the user who has drawn the handwritten characters 150 is improved, whereby the user's operability of the UI screen 160 can be improved.

(2) Since the UI screen 160 is so displayed that the orientation thereof coincides with the drawing direction of the handwritten characters 150, the user can readily issue a manipulation instruction via the UI screen 160 in the state in which the user directly faces the handwritten characters 150.

(3) Since the UI screen 160 is displayed in the vicinity of the handwritten characters 150, the visibility of the UI screen 160 corresponding to the handwritten characters 150 is improved.

(4) At least one of the displayed color, enlargement, reduction, and range specification of the handwritten characters 150 can be specified via the UI screen 160.

(5) In the case where a plurality of sets of handwritten characters 150 are displayed, the drawing direction of the UI screen 160 is determined on the basis of the handwritten characters 150 pointed by a pointing action.

Embodiment 2

Embodiment 2 of the invention will next be described. In the following description, the same portions as those having already been described have the same reference characters and will not be described.

Figure 14:
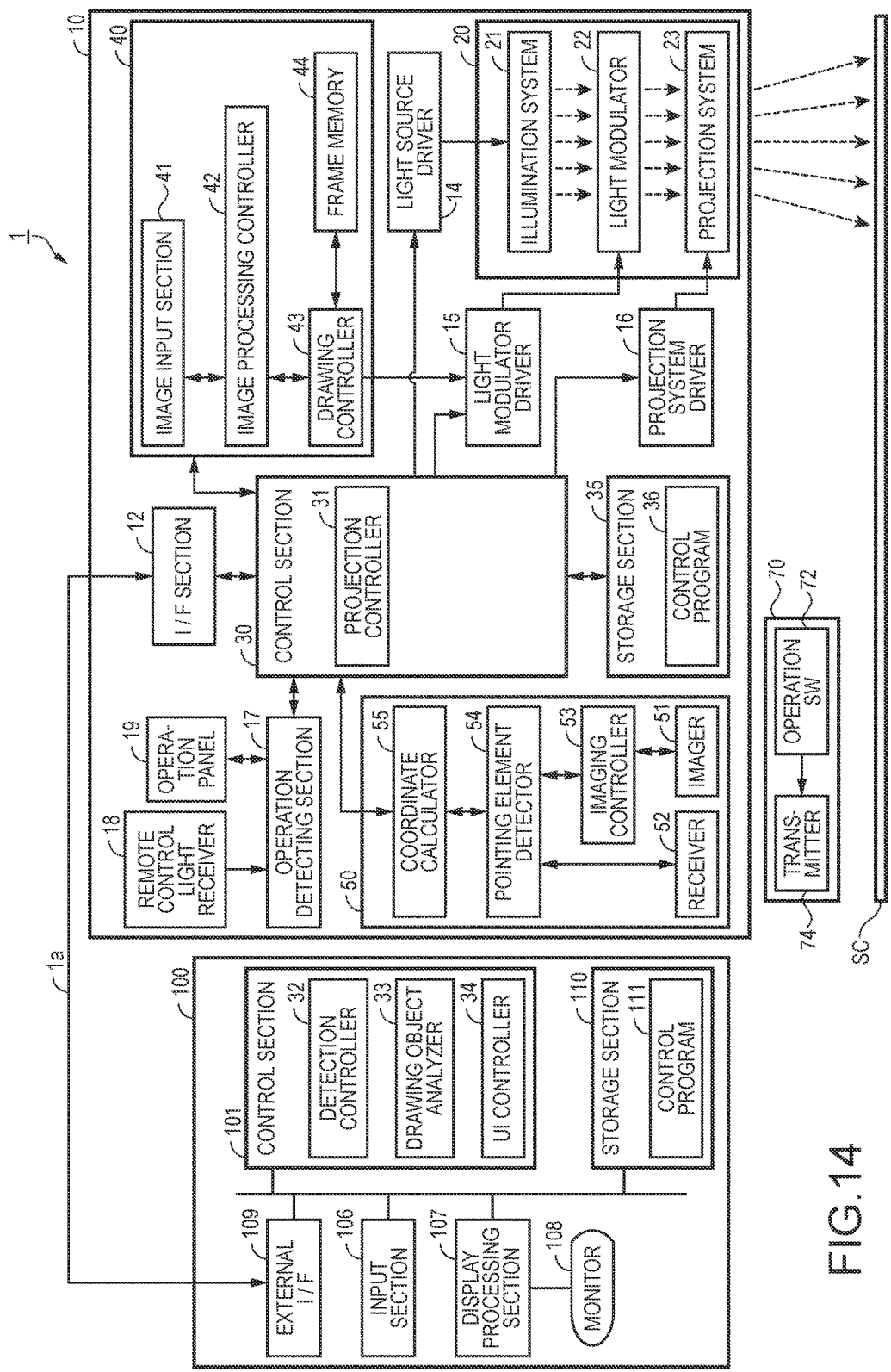
FIG. 14 shows the configuration of a projection system according to Embodiment 2.

FIG. 14 shows the configuration of a projection system 1. In Embodiment 1, the projection system 1 has the configuration including the projector 10, that is, the projection system 1 is formed of a single apparatus, whereas in Embodiment 2, the projection system 1 is formed of a plurality of apparatus, such as the projector 10 and a computer apparatus 100.

The computer apparatus 100 is a kind of information processing apparatus and includes a control section 101, a storage section 110, an external interface (hereinafter abbreviated to "external I/F") 109, an input section 106, a display processing section 107, and a monitor 108. The computer apparatus 100 is assumed to be provided in the form of a personal computer or a tablet terminal.

The control section 101 is achieved, for example, by a CPU, a ROM that stores a basic control program and other programs executed by the CPU, and a RAM that temporarily stores the programs executed by the CPU, data processed by the CPU, and other pieces of information. In Embodiment 1, the control section 30 of the projector 10 includes the detection controller 32, the drawn object analyzer 33, and the UI controller 34, whereas in Embodiment 2, the control section 101 of the computer apparatus 100 includes the detection controller 32, the drawn object analyzer 33, and the UI controller 34.

The input section 106 detects input operation using an input device including a keyboard, a mouse, and other pointing devices. The display processing section 107 displays the content of the input operation detected by the input section 106, a result of processing performed by the control section 101, and other pieces of information on the monitor 108. The storage section 110 stores a variety of programs including a control program 111 executed by the control section 101, data processed by the programs, and other pieces of information in an involatile manner.

The external I/F 109 is connected to an interface section (hereinafter abbreviated to "I/F section") 12, with which the projector 10 is provided, via a cable 1*a* in such a way that the external I/F 109 and the interface section 12 can communicate with each other. The external I/F 109 has the function of the image data input section 11 described in Embodiment 1 and the function of transmitting and receiving control information and other pieces of information to and from the projector 10.

The control section 101 executes the control program 111 to generate control signals that control the projector 10 and transmits the control signals to the projector 10. The projector 10 receives the control signals and performs a variety of actions on the basis of the control signals.

The control section 101 further generates image data to be projected by the projector 10 and transmits the generated image data to the projector 10. The projector 10 receives the image data and projects an image on the basis of the image data.

Further, the detection controller 32 receives detection information representing the position pointed by the pointing element 70 and detected by the imager 51. The drawn object analyzer 33 analyzes an object drawn on the screen SC by the operator's operation of the pointing element 70 on the basis of the pointing position indicated by the detection information. The UI controller 34 instructs the projection position and inclination of the UI screen 160 to be projected on the screen SC to the control section 30 of the projector 10 on the basis of a result of the analysis performed by the drawn object analyzer 33.

In this case, the UI controller 34 calculates the angle of rotation of the UI screen 160 and outputs the calculated angle of rotation to the projector 10. That is, the process of rotating the UI screen 160 is carried out by the control section 30 of the projector 10, but the aspect described above is not necessarily employed.

For example, the UI controller 34 instead calculates the angle of rotation of the UI screen 160, generates the UI screen 160 rotated on the basis of the angle of rotation, and outputs the UI screen 160 to the projector 10. The projector 10 may display the UI screen 160 outputted from the computer apparatus 100. That is, it is conceivable to employ an aspect in which the projector 10 does not carry out the process of rotating the UI screen 160 but the UI controller 34 of the computer apparatus 100 carries out the process of rotating the UI screen 160.

Embodiment 2 described above provides the following advantageous effect in addition to the advantageous effects (1) to (5) described in Embodiment 1.

(6) Since the detection controller 32, the drawn object analyzer 33, and the UI controller 34 are present in the computer apparatus 100, the process of detecting the angle of rotation of the handwritten characters 150, rotating the UI screen 160 by the detected angle of rotation, and projecting the UI screen 160 in the vicinity of the handwritten characters 150 can be quickly carried out.

The invention has been described above with reference to the illustrated embodiments, but the invention is not limited to the embodiments, and the following variations are conceivable:

(1) How to display an image is not limited to the projection performed by the projector 10, and a touch panel including a liquid crystal display is also conceivable.

(2) The light modulator 22 has been described with reference to the configuration using the three transmissive liquid crystal panels corresponding to the RGB colors, but not limited thereto. For example, a configuration using three reflective liquid crystal panels may be employed, or the combination of one liquid crystal panel and a color wheel may be used. Still instead, the light modulator 22 may be formed of three digital mirror devices (DMDs) or may, for example, employ a DMD method using the combination of one digital mirror device and a color wheel. In the case where only one liquid crystal panel or DMD is used as the light modulator 22, a member corresponding to the light combining system, such as a cross dichroic prism, is not required. Further, a light modulator 22 different from a liquid crystal panel or a DMD but capable of modulating light emitted from a light source can be employed.

The control section 30 shown in FIG. 2 and the control sections 30 and 101 shown in FIG. 14 each represent a functional configuration achieved by cooperation between hardware and software and are not each necessarily implemented in a specific form. Therefore, hardware corresponding to each of the functional portions is not necessarily implemented, and a single processor that executes a program can, of course, achieve the functions of the plurality of functional portions. Further, in the embodiments described above, part of the functions achieved by software in the embodiments described above may be achieved by hardware, or part of the functions achieved by hardware may be achieved by software.

What is claimed is:

1. A display apparatus comprising:
a projector that detects a pointing action;
a display that displays a first image based on the pointing action;
a controller that detects a display direction of the first image in the display; and
a processor that functions as:
a determination section that determines, based on the display direction of the first image in the display, a display aspect of a second image in such a way that a display direction of the second image coincides with the display direction of the first image, the second image being different from the first image and including options, the options allowing manipulation of the first image; and
a display control section that causes the display to display, along with the first image, the second image based on the display aspect determined by the determination section with the options displayed in the second image.

2. The display apparatus according to claim 1,
wherein the display control section rotates the second image based on the display aspect and displays the rotated second image in a vicinity of the first image.

3. The display apparatus according to claim 1,
wherein at least one of a displayed color, enlargement, reduction, and range specification of the second image is capable of being specified with respect to the first image.

4. The display apparatus according to claim 1,
wherein in a case where the first image is formed of a plurality of first images and the plurality of first images are displayed in the display, the determination section determines the display aspect of the second image based on the first image pointed by the pointing action.

5. The display apparatus according to claim 4,
wherein in a case where the pointing action points one of the plurality of first images, the determination section determines the display aspect of the second image in such a way that an orientation of the second image coincides with the display direction of the pointed first image.

6. The display apparatus according to claim 4,
wherein in a case where the pointing action points the plurality of first images, the determination section determines the display aspect of the second image based on directions of the plurality of first images.

7. An information processing apparatus that processes a first image displayed based on a pointing action, the information processing apparatus comprising:
  a processor that functions as:
  a determination section that determines, based on a detected display direction of the displayed first image, a display aspect of a second image in such a way that a display direction of the second image coincides with the display direction of the first image, the second image being different from the first image and including options, the options allowing manipulation of the first image; and
  a display control section that displays, along with the first image, the second image based on the display aspect determined by the determination section, with the options displayed in the second image.

8. An information processing method comprising: detecting a pointing action; displaying a first image on a display based on the pointing action; detecting a display direction of the first image on the display; determining, based on the display direction of the displayed first image, a display aspect of a second image in such a way that a display direction of the second image coincides with the display direction of the first image, the second image being different from the first image and including options, the options allowing manipulation of the first image; and displaying, on the display and along with the first image, the second image based on the determined display aspect, with the options displayed in the second image.

* * * * *